(12) United States Patent
Deng

(10) Patent No.: US 11,967,864 B2
(45) Date of Patent: Apr. 23, 2024

(54) ELECTRIC MACHINE ROTOR

(71) Applicant: FORD GLOBAL TECHNOLOGIES, LLC, Dearborn, MI (US)

(72) Inventor: Chuan Deng, Jiangsu (CN)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 17/534,030

(22) Filed: Nov. 23, 2021

(65) Prior Publication Data

US 2022/0173627 A1 Jun. 2, 2022

(30) Foreign Application Priority Data

Nov. 27, 2020 (CN) .......................... 202011367327.4

(51) Int. Cl.
*H02K 1/276* (2022.01)
*H02K 1/26* (2006.01)
*H02K 1/28* (2006.01)
*H02K 3/47* (2006.01)
*H02K 15/02* (2006.01)

(52) U.S. Cl.
CPC .............. *H02K 1/276* (2013.01); *H02K 1/26* (2013.01); *H02K 1/28* (2013.01); *H02K 15/02* (2013.01); *H02K 3/47* (2013.01)

(58) Field of Classification Search
CPC ............ H02K 1/276; H02K 1/26; H02K 1/28; H02K 15/02; H02K 3/47; H02K 1/2766; H02K 1/274; H02K 2213/03; B60K 6/26
See application file for complete search history.

(56) References Cited

U.S. PATENT DOCUMENTS

2008/0093944 A1* 4/2008 Takahashi ............ H02K 1/246
  310/156.43
2020/0044501 A1* 2/2020 Matsubara ............ H02K 29/03

OTHER PUBLICATIONS

IEC Frame motors. Rev. Dec. 2019 Acessed as: https://acim.nidec.com/motors/usmotors/-/media/usmotors/documents/literature/datasheets/product-data-sheets/iec-frame-motors-pds.ashx (Year: 2019).*

* cited by examiner

*Primary Examiner* — Christopher M Koehler
*Assistant Examiner* — Riley Owen Stout
(74) *Attorney, Agent, or Firm* — Brooks Kushman PC; David B. Kelly

(57) ABSTRACT

An electric machine rotor including a rotor core having a plurality of magnets and several pairs of elongated slots circumferentially distributed on the rotor core. Each pair of elongated slots jointly forms a V-shaped configuration with an opening facing an outer periphery of the rotor core. Each elongated slot includes a mounting portion that matches the shape of the magnet and an end hole located at an end of the elongated slot pointing to the outer periphery. The end hole includes a main body area and a lobe area, and the lobe area extends from the main body area toward outside of the V-shaped configuration until it is partially located outside a side extension line of the mounting portion.

18 Claims, 7 Drawing Sheets

ELECTRIC MACHINE ROTOR

CROSS-REFERENCE TO RELATED APPLICATIONS

This application claims foreign priority benefits under 35 U.S.C. § 119(a)-(d) to CN Application 2020 113 673 274 filed Nov. 27, 2020, which is hereby incorporated by reference in its entirety.

TECHNICAL FIELD

This disclosure generally relates to electric machine technology.

BACKGROUND

Existing electric machines lose energy when converting electrical energy into mechanical energy. This kind of loss of the electric machines can generally be divided into three parts: variable loss, fixed loss and stray loss. Among them, the fixed loss is a loss that has nothing to do with the load, and an important part of which is core loss (also known as magnetic core loss). The core loss refers to the ineffective energy consumed by core materials per unit weight under the action of an alternating magnetic field or a pulsating magnetic field. The core loss is manifested in the form of heat, which will heat the core, increase the temperature, and further increase overall loss of the electric machine.

Reducing the core loss is one goal in electric machine design. Reducing flux density in the rotor and stator is currently considered to be one of the effective ways to reduce the core loss. In conventional design, the overall flux density is reduced mainly by increasing partial size of the rotor or stator, such as increasing the size of the magnet(s) at the outer periphery of the rotor, which increases the amount of iron used in the electric machine. This solution will cause torque of the electric machine to be reduced at the same time, and further measures are needed to compensate for the reduced torque, such as changing to a larger magnet.

To solve such problems, for example, Chinese Patent Document 201320629997.8 proposes a permanent magnet synchronous electric machine for vehicles, which includes a stator and a rotor. The stator includes a stator punching sheet; and 48 flat-bottomed grooves are arranged at the stator punching sheet. The rotor includes a rotor punching sheet; and 16 permanent magnet grooves and 16 air gap arcs are arranged at the rotor punching sheet. One permanent magnet is embedded into each permanent magnet groove; adjacent permanent magnet grooves form one pair of permanent magnet grooves, wherein the two permanent magnet grooves in the pair of permanent magnet grooves are arranged in a V-shaped mode and the opposite angle is 120 degrees; and the opening direction of each pair of permanent magnet grooves faces the external boundary of the rotor punching sheet. The 16 air gap arcs are respectively arranged at the positions, approaching the 16 permanent magnet grooves, of the external boundary of the rotor punching sheet. According to the scheme, it is proposed to reduce the flux density by changing the topological structure of the rotor, thereby reducing the overall core loss.

SUMMARY

The present disclosure summarizes aspects of the embodiments and should not be used to limit the claims. Other implementations are contemplated in accordance with the techniques described herein, as will be apparent to those of ordinary skill in the art upon examination of the following drawings and detailed description, and such implementations are intended to be within the scope of this application.

The inventors of the present disclosure have realized that there is a need for an electric machine rotor and a vehicle electric machine containing the same, which can significantly reduce the overall core loss of the electric machine by changing the local topology of the rotor without adverse manufacturing effects or adverse performance, such as reducing the torque.

According to an aspect of the present disclosure, an electric machine rotor including a rotor core is provided, the rotor core comprises a plurality of magnets and several pairs of elongated slots circumferentially distributed on the rotor core, each pair of elongated slots jointly forms a V-shaped configuration with an opening facing an outer periphery of the rotor core, and each elongated slot comprises a mounting portion that matches a shape of the magnet and an end hole located at an end of the elongated slot pointing to the outer periphery, wherein, the end hole includes a main body area and a lobe area, and the lobe area extends from the main body area toward an exterior of the V-shaped configuration until it is partially located outside a side extension line of the mounting portion.

According to an embodiment of the present disclosure, the main body area further comprises a middle area and a tapered area that tapers from the middle area toward the mounting portion to form a transition portion between the middle area and the tapered area.

According to an embodiment of the present disclosure, the rotor core further comprises a second transition portion formed between the main body area and the lobe area.

According to an embodiment of the present disclosure, the end holes of each pair of elongated slots are symmetrical with respect to an intermediate axis of the V-shaped configuration.

According to an embodiment of the present disclosure, the lobe area extends a distance greater than 1 mm outside the side extension line of the mounting portion.

According to an embodiment of the present disclosure, the tapered area has a width at an end connected to the mounting portion smaller than a width of the mounting portion.

According to an embodiment of the present disclosure, the transition portion is located on an outer side of the V-shaped configuration.

According to an embodiment of the present disclosure, the several pairs of elongated slots are symmetrically distributed with respect to a central axis of the rotor core.

According to an embodiment of the present disclosure, the several pairs of elongated slots include a plurality of groups, and the V-shaped configurations formed by the multiple pairs of elongated slots in each group face the same radial direction of the rotor core and are nested one inside the other.

According to an embodiment of the present disclosure, the lobe areas on the elongated slots located outside of the nested V-shaped configurations extend a greater distance than the lobe areas on the elongated slots located inside of the nested V-shaped configurations.

According to an aspect of the present disclosure, an electric machine rotor including a rotor core is provided, the rotor core comprises a plurality of permanent magnets, several pairs of elongated slots circumferentially distributed on the rotor core, each pair of elongated slots jointly forms a V-shaped configuration with an opening facing an outer periphery of the rotor core, and each elongated slot comprises, a mounting portion that matches shape of the permanent magnet, and an end hole located at an end of the elongated slot pointing to the outer periphery, wherein, the end hole includes a main body area and a lobe area, and the lobe area extends from an end of the main body area adjacent to the outer periphery to an exterior of the V-shaped configuration until it is partially located outside a side extension line of the mounting portion.

According to an embodiment of the present disclosure, the main body area further comprises a middle area and a tapered area that tapers from the middle area toward the mounting portion to form a transition portion between the middle area and the tapered area.

According to an embodiment of the present disclosure, the rotor core further comprises a second transition portion formed between the main body area and the lobe area.

According to an embodiment of the present disclosure, the end holes of each pair of elongated slots are symmetrical with respect to an intermediate axis of the V-shaped configuration.

According to an embodiment of the present disclosure, the lobe area extends a distance greater than 1 mm outside the side extension line of the mounting portion.

According to an embodiment of the present disclosure, the tapered area has a width at an end connected to the mounting portion smaller than a width of the mounting portion.

According to an embodiment of the present disclosure, the transition portion is located on an outer side of the V-shaped configuration.

According to an embodiment of the present disclosure, the several pairs of the elongated slots include a plurality of groups, and the V-shaped configurations formed by the multiple pairs of elongated slots in each group face the same radial direction of the rotor core and are nested one inside the other.

According to an embodiment of the present disclosure, the lobe areas on the elongated slots located outside of the nested V-shaped configurations extends a greater distance than the lobe areas on the elongated slots located inside of the nested V-shaped configurations.

According to an aspect of the present disclosure, a vehicle electric machine comprising the electric machine rotor as described above is also provided.

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like referenced numerals refer to like parts throughout the different figures.

DETAILED DESCRIPTION

Figure 1:
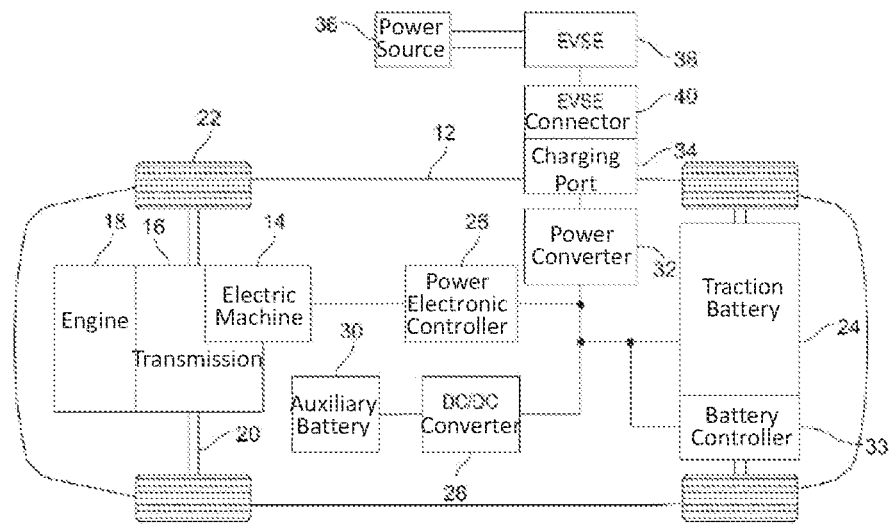
FIG. 1 shows a block diagram of an electrified vehicle including a vehicle electric machine according to one or more embodiments of the present disclosure.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present disclosure in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

In this application, when an element or a part is referred to as being "on", "joined to", "connected to" or "coupled to" another element or part, the element or part may be directly on another element or part, joined, connected or coupled to another element or part, or there may be intervening elements or parts. In contrast, when an element is referred to as being "directly on", "directly joined to", "directly connected to" or "directly coupled to" another element or part, there may be no intervening elements or parts. Other words used to describe the relationship between elements should be interpreted in a similar manner.

The inventors of the present disclosure have realized that in the solutions in the prior art, there is still room for improvement in terms of how to significantly reduce the overall core loss of the electric machine by changing the local topology of the rotor. For example, the inventors have realized that certain adjustments to the topology of an elongated slot used to install the magnet can significantly reduce the overall air gap flux density and associated core loss. In view of these problems in the prior art, the inventors of the present disclosure propose an electric machine rotor and a vehicle electric machine containing the same in one or more embodiments, which is believed to be able to solve one or more problems in the prior art.

In existing electric machines, such as permanent magnet synchronous electric machines, magnets mounted on or embedded in rotors of the electric machines are coupled with an internal magnetic field caused by current in the electric machines and generated by electrical input of stators. Individual stator tooth and stator windings form a plurality of magnetic poles that generate a flux flow pattern when a multi-phase sinusoidal voltage and current pass through stator coils. For example, a three-phase electric machine will have a total of 8 poles and 48 slots. The flux generated by the stator windings interacts with rotor flux generated by the magnets in the electric machine rotor, so that a rotor torque is generated when the stator windings are excited by a polyphase voltage.

The magnets of the rotor may be positioned or oriented in different ways to generate the desired magnetic field. Each magnetic pole may be formed by a single magnet oriented in a radially outward direction with one magnetic pole (i.e., north or south pole). The magnetic poles of the rotor may also be formed by multiple sets of magnets arranged to form the magnetic poles together. One such arrangement orients the magnets in a V-shaped configuration. Inner part of the "V" has similar magnetic poles that cooperate to form a rotor pole. Each magnet can be placed in an elongated hole (also called a recess or cavity) to maintain its position. These elongated holes are generally rectangular and are arranged to match the shape of the magnets. The elongated holes may be slightly larger at opposite ends to limit leakage of flux between the north and south poles of the individual magnets. Voids or cavities in a rotor core hinder the flux because vacuum has a relatively low magnetic permeability compared to materials of the rotor core (e.g., electrical steel).

FIG. 1 depicts a block diagram of an electrified vehicle 12 including an electric machine rotor or a vehicle electric machine according to one or more embodiments of the present disclosure. In the context of the present disclosure, the electrified vehicle 12 may be a plug-in hybrid electric vehicle (PHEV), a full hybrid electric vehicle (FHEV), a mild hybrid electric vehicle (MHEV), or a battery electric vehicle (BEV), etc.

In the embodiment of FIG. 1, the vehicle 12 includes one or more electric machines 14 mechanically connected to a hybrid transmission 16. The electric machine 14 can operate as a motor or a generator. In addition, the hybrid transmission 16 may be mechanically connected to an engine 18. The hybrid transmission 16 may also be mechanically connected to a drive shaft 20, which is mechanically connected to wheels 22. When the engine 18 is activated or shut down, the electric machine 14 may provide propulsion and/or regenerative braking. The electric machine 14 can also be operated as a generator, and can provide fuel economy benefits by recovering energy that is normally lost as heat in a friction braking system. The electric machine 14 can also provide reduced pollutant emissions because the hybrid electric vehicle 12 can be operated in an electric mode or a hybrid mode under certain conditions, which can reduce the overall fuel consumption of the vehicle 12.

A traction battery (or battery pack) 24 stores and provides energy that can be used by the electric machine 14. The traction battery 24 may provide a high voltage DC (direct current) output from one or more battery cell arrays (sometimes referred to as a battery cell stack) within the traction battery 24. The battery cell array may include one or more battery cells. The traction battery 24 may be electrically connected to one or more power electronic controllers 26 through one or more contactors (not shown). One or more contactors isolate the traction battery 24 from other components when opened, and connect the traction battery 24 to the other components when closed.

The power electronic controller 26 may also be electrically connected to the electric machine 14 and may be configured to transfer electric energy between the traction battery 24 and the electric machine 14 in both directions. For example, the traction battery 24 may provide a DC voltage, while the electric machine 14 may require a three-phase AC (alternating current) voltage when running. The power electronic controller 26 can convert the DC voltage into the three-phase AC voltage according to the requirements of the electric machine 14. In a regenerative mode, the power electronic controller 26 can convert the three-phase AC voltage from the electric machine 14 acting as a generator into the DC voltage required by the traction battery 24. Those skilled in the art can understand that the parts described herein are also applicable to pure electric vehicles. For the pure electric vehicle, the hybrid transmission 16 may be a gear box connected to the electric machine 14, and the engine 18 can be absent.

In addition to providing energy for propulsion, the traction battery 24 can also provide energy for other vehicle electrical systems. A DC/DC converter 28 can convert the high-voltage DC output of the traction battery 24 into a low-voltage DC power source compatible with other vehicle loads. Other high-voltage loads (such as compressors and electric heaters) can be directly connected to the high-voltage without using the DC/DC converter 28. A low-voltage system may be electrically connected to a auxiliary battery 30 (for example, a 12V battery).

A battery controller 33 may communicate with the traction battery 24. The battery controller 33 may be configured to monitor and manage the operation of the traction battery 24, such as by an electronic monitoring system (not shown) that manages the temperature and state of charge of each battery cell.

The traction battery 24 can be recharged by an external power source 36. The external power source 36 may be a connection to a power socket. The external power source 36 may be electrically connected to an electric vehicle supply equipment (EVSE) 38. The EVSE 38 may provide circuits and controls for managing the power transfer between the power source 36 and the vehicle 12. The external power source 36 may provide DC or AC power to the EVSE 38.

The EVSE 38 may have a charging connector 40 for plugging into a charging port 34 of the vehicle 12. The charging port 34 may be any type of port configured to transfer power from the EVSE 38 to the vehicle 12. The charging port 34 may be electrically connected to a charger or a power converter 32. The power converter 32 may adjust the power supplied from the EVSE 38 to provide the traction battery 24 with appropriate voltage and current levels. The power converter 32 may interface with the EVSE 38 to coordinate power delivery to the vehicle 12. The EVSE connector 40 may have pins that mate with corresponding grooves of the charging port 34.

Figure 2:
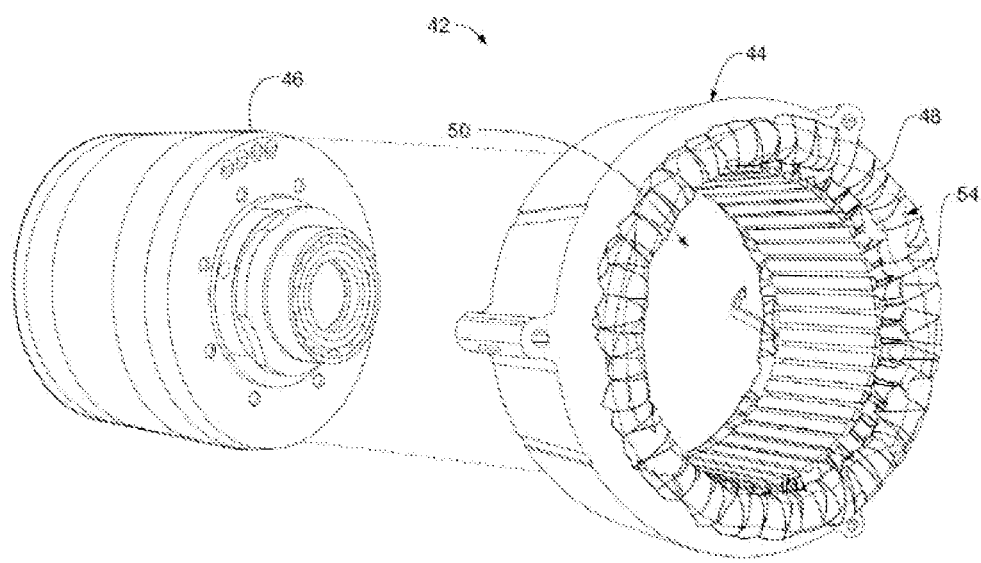
FIG. 2 shows a schematic view of a representative electric machine according to one or more embodiments of the present disclosure.

FIG. 2 shows a representative electric machine according to one or more embodiments of the present disclosure, generally referred to herein as electric machine 42. The electric machine 42 may include a stator 44 and a rotor 46. In some embodiments for vehicles, the electrified vehicle 12 may include two electric machines. One electric machine can be operated mainly as a motor, and the other electric machine can be operated mainly as a generator. The motor can be used to convert electric power into mechanical power, and the generator can be used to convert mechanical power into electric power.

In one example, referring to FIG. 2, the stator 44 may define a cavity 50. The rotor 46 can be sized to be set and operated in the cavity 50. A shaft (not shown) operatively connected to the rotor 46 can drive the rotor to rotate and/or transfer rotational energy generated by the operation of the rotor 46 to one or more subsystems of the vehicle 12. The stator 44 may include a winding 48 disposed around an outer periphery of the cavity 50 to surround an outer surface of the rotor 46. In the example of the electric machine operated as a motor, current may be fed to the winding 48 to rotate the rotor 46. In the example of the electric machine operated as a generator, current can be generated in the winding 48 by the rotation of the rotor 46 to power the components of the vehicle 12.

Figure 3:
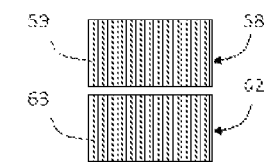
FIG. 3 shows a partial cross-sectional view of a representative electric machine according to one or more embodiments of the present disclosure.
Figure 3:
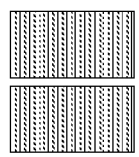

FIG. 3 shows a partial cross-sectional view of the electric machine 42. In one or more embodiments, the rotor 46 includes a rotor core 62 formed of one or more rotor laminations 63. The stator 44 may include a stator core 58 formed of one or more stator laminations 59. The rotor core 62 rotates relative to the stator core 58 about an axis 54.

Figure 5:
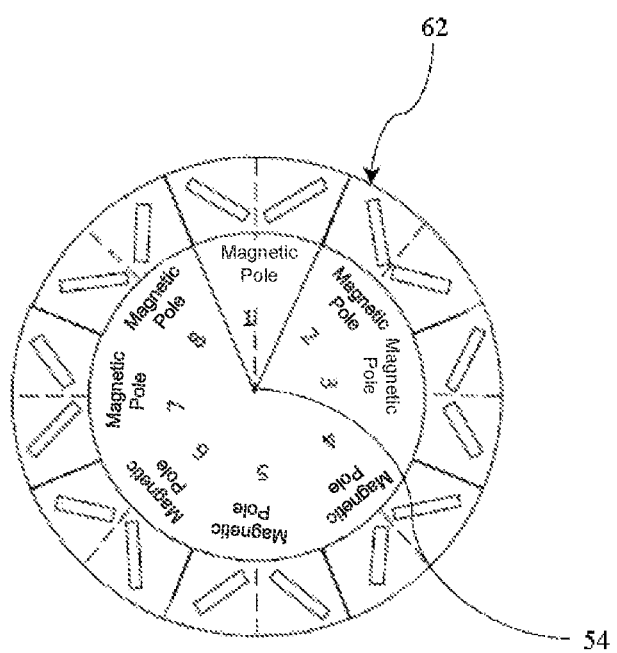
FIG. 5 shows a schematic view of an end face of an electric machine rotor according to one or more embodiments of the present disclosure.
Figure 6:
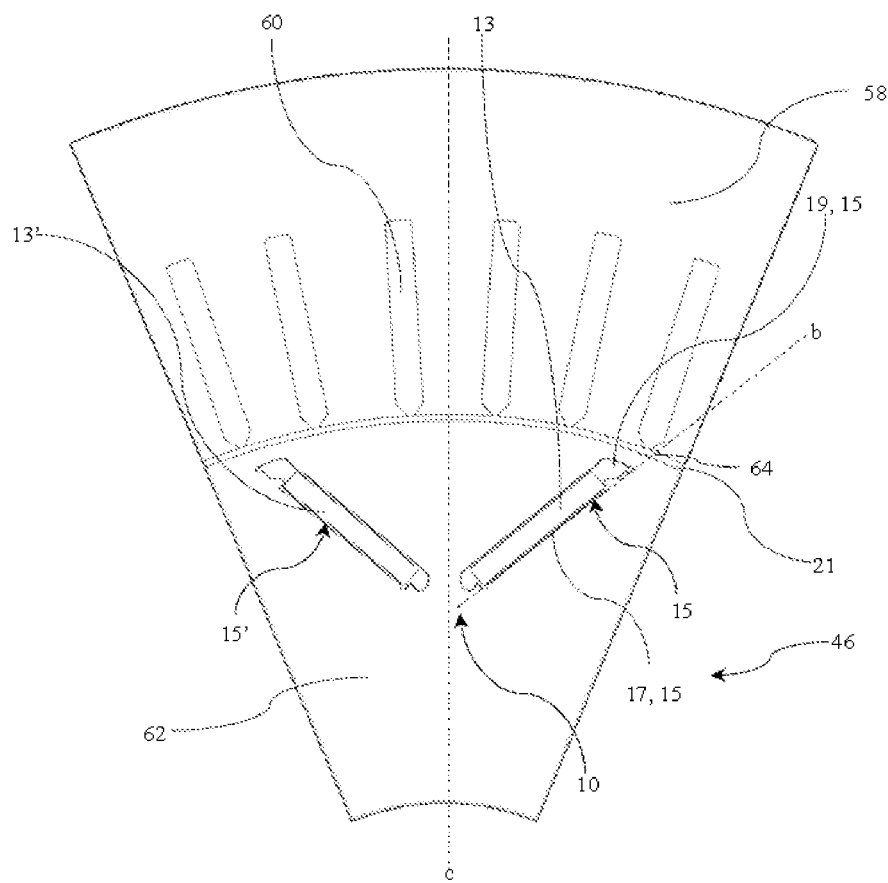
FIG. 6 shows a partial radial cross-sectional view of an electric machine including an electric machine rotor according to one or more embodiments of the present disclosure.

FIG. 6 shows a partial radial cross-sectional view of an electric machine including an electric machine rotor according to one or more embodiments of the present disclosure. As shown in the figure, the electric machine rotor 46 includes the rotor core 62, which includes a plurality of magnets 13, 13' and several pairs of elongated slots 15, 15'. Referring to FIG. 5 while referring to FIG. 6, the several pairs of elongated slots 15, 15' are circumferentially distributed on the rotor core 62, and the pair of magnets 13, 13' fitted in each pair of elongated slots 15, 15' jointly form a corresponding magnetic poles. In the embodiment shown in FIG. 5, a total of 8 pairs of elongated slots and 8 magnetic poles are shown. It should be understood by those skilled in the art that the specific number is only illustrative here and not limited. In addition, in the context of the present disclosure, "circumferentially distributed" used here means that the several pairs of elongated slots 15 and 15' are circumferentially distributed around the rotation axis 54 of the rotor core 62.

Each pair of elongated slots 15 and 15' jointly form a V-shaped configuration 10 with an opening facing an outer periphery 21 of the rotor core 62. Taking the elongated slot 15 as an example, each elongated slot includes a mounting portion 17 that matches the shape of the magnet 13 and an end hole 19. The end hole 19 is located at an end of the elongated slot 15 pointing to the outer periphery 21 of the rotor core 62, as shown in FIG. 6.

Figure 7:
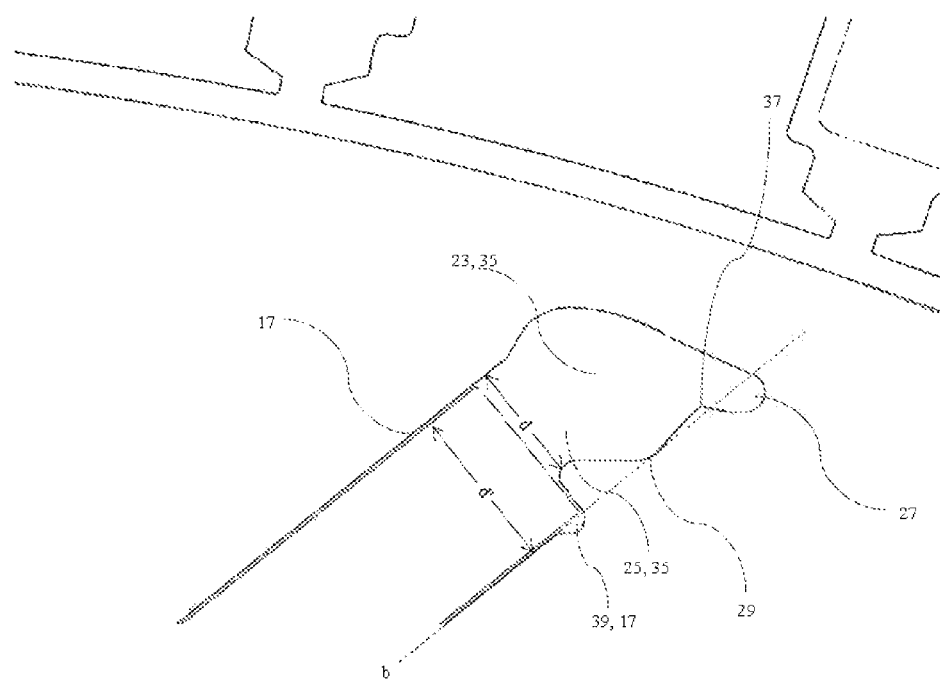
FIG. 7 shows an enlarged view of a part containing an end hole of an electric machine rotor according to one or more embodiments of the present disclosure.

With further reference to the partial enlarged view shown in FIG. 7, the end hole 19 includes a main body area 35 and a lobe area 27. The lobe area 27 extends from the main body area 35 toward an exterior of the V-shaped configuration 10 until it is partially located outside a side extension line b of the mounting portion 17. In the present disclosure, the exterior of the V-shaped configuration 10 refers to the part other than the pair of elongated slots 15, 15' themselves and the part between them, and the pair of elongated slots 15, 15' themselves and the part between them belongs to an interior of the V-shaped configuration 10. Specifically the exterior and interior are bounded by the side extension lines b of the mounting portions 17 of the elongated slots 15, 15'. In the context of the present disclosure, the side extension line refers to the side of the mounting portion located in the exterior of the V-shaped configuration 10, such as the side extension line b as shown in FIG. 6.

Figure 4:
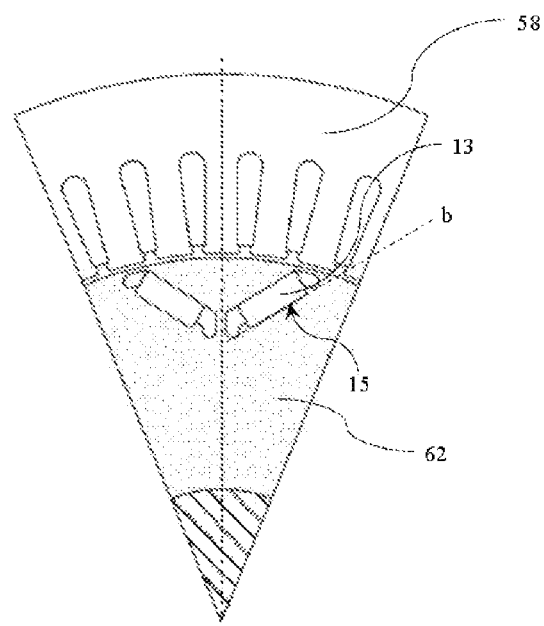
FIG. 4 shows a partial cross-sectional view of an electric machine in the prior art.

According to some embodiments of the present disclosure, the main body area 35 is located in the interior of the V-shaped configuration 10, that is, within the side extension line b, as shown in FIG. 7. Compared with the partial radial cross-sectional view of the prior art rotor shown in FIG. 4, the end hole 19 of the rotor core 62 in the prior art is entirely located inside the side extension line b, and does not extend beyond the side extension line b.

In addition, in one or more embodiments, on the outside of the mounting portion 17 (here, the exterior of the V-shaped configuration 10) adjacent to the end hole 19, the mounting portion 17 may further include a mounting portion extension area 39 here, which extends beyond the side extension line b, as shown in FIG. 7.

The stator core 58 and the rotor core 62 may define an air gap 64 between an inner periphery of the stator core 58 and the outer periphery 21 of the rotor core 62. The stator core 58 may define a plurality of grooves 60 that extend radially from the inner periphery of the stator core 58 and are sized to accommodate or hold coil windings (e.g., the winding 48). It should be understood that the magnets 13 and 13' and the elongated slots 15 and 15' may include corresponding cross-sectional shapes perpendicular to the rotation axis 54, such as the rectangular shape shown in FIG. 3 or alternatively an arc shape. The rotor core 62 may also define a circular central opening for receiving the shaft of the rotor 46.

In one or more embodiments, the magnets 13, 13' may include one or more of the following: ferrite magnets, alnico magnets, rare earth magnets (such as but not limited to neodymium iron boron (NedFeB)) and the like. In one or more embodiments, the magnets 13, 13' can each be formed as a single piece of magnet. In other embodiments, the magnets 13, 13' can each also be formed by stacking a plurality of magnet blocks.

According to several embodiments of the present disclosure, the main body area 35 further includes a middle area 23 and a tapered area 25, as shown in FIG. 7. The tapered area 25 is connected to the middle area 23 and tapers from the middle area 23 toward the mounting portion 17, thereby causing a transition portion 29 to be formed between the middle area 23 and the tapered zone 25. The middle area 23 is further connected to the lobe area 27. In some further embodiments, the transition portion 29 is located on the side extension line b.

In some embodiments of the present disclosure, as shown in FIG. 7, a second transition portion 37 is further included between the main body area 35 and the lobe area 27. The second transition portion 37 is a transition portion between the lobe area 27 and the main body area 35, specifically, the middle area 23, caused by the extension of the lobe area 27 to the outside of the side extension line b. According to several further embodiments, the second transition portion 37 may be located on the side extension line b, that is, the lobe area 27 extends to the outside of the side extension line b at the second transition portion 37.

According to some embodiments of the present disclosure, the end holes 19 of each pair of elongated slots 15 and 15' are symmetrical with respect to an intermediate axis c of the V-shaped configuration 10. In some further embodiments, each pair of elongated slots 15 and 15' are symmetrical with respect to the intermediate axis c of the V-shaped configuration 10 in their entirety. According to some embodiments, the intermediate axis c extends through the center of the rotor core 62 and intersects the central axis 54.

In some embodiments of the present disclosure, the lobe area 27 extends a distance greater than 1 mm outside of the side extension line b of the mounting portion 17. According to a further embodiment, the lobe area 27 extends a distance greater than 1.5 mm outside of the side extension line b of the mounting portion 17. According to a further embodiment, the lobe area 27 extends a distance greater than 2 mm outside of the side extension line b of the mounting portion 17.

Further, according to some embodiments of the present disclosure, the tapered area 25 has a width d at an end connected to the mounting portion 17 smaller than a width d' of the mounting portion, so as to hold the magnets 13, 13' more stably, as shown in FIG. 7.

According to some embodiments of the present disclosure, the transition portion 29 is located on an outer side of the V-shaped configuration 10, as shown in FIG. 7. According to a further embodiment, the second transition portion 37 is also located on the outer side of the V-shaped configuration 10. In the context of the present disclosure, the outer side of the V-shaped configuration 10 refers to the side of the elongated slots 15, 15' away from the intermediate axis c, and may have a curved shape.

Further, according to several embodiments of the present disclosure, the several pairs of elongated slots 15, 15' are symmetrically distributed with respect to the central axis 54 of the rotor core 46, as shown in FIG. 5. FIG. 5 shows a total of 8 pairs of elongated slots 15, 15' and magnets 13, 13' located therein, but it is understood that the rotor core may include more or less number of elongated slots 15, 15' and magnets 13, 13' located therein.

Figure 8:
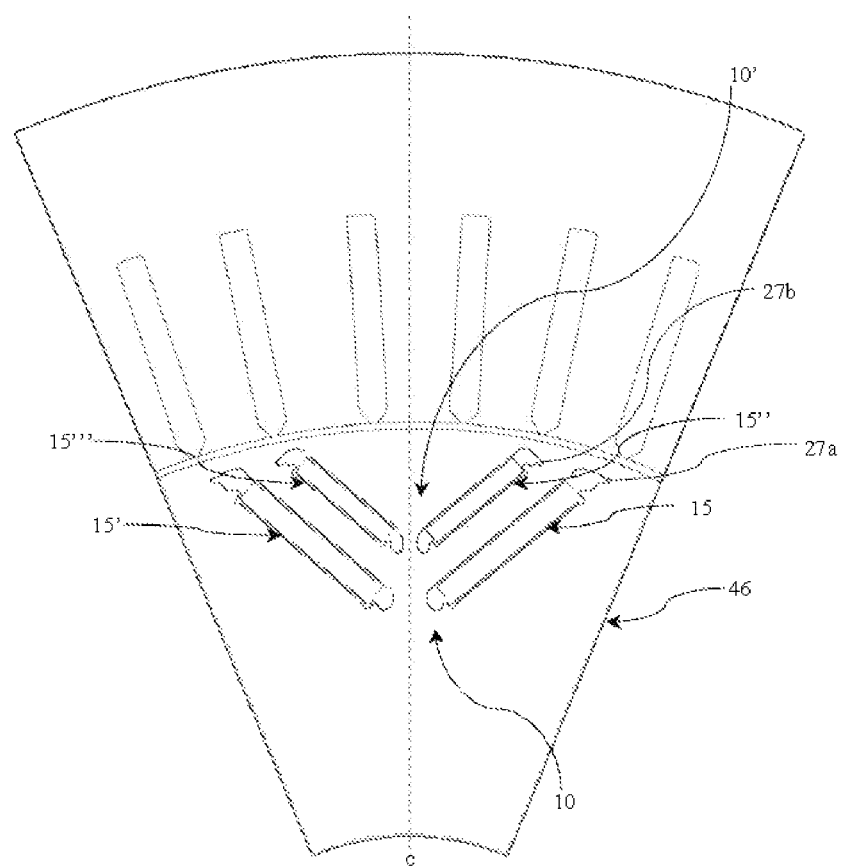
FIG. 8 shows a partial radial cross-sectional view of an electric machine including an electric machine rotor according to one or more embodiments of the present disclosure, which shows nested V-shaped configurations.

In addition, in several further embodiments of the present disclosure, as shown in FIG. 8, the several pairs of elongated slots 15, 15' include a plurality of groups, and the V-shaped configurations formed by the multiple pairs of elongated slots 15, 15' in each group face the same radial direction of the rotor core 46 and are nested (or telescoped) one inside the other. In FIG. 8, the V-shaped configuration 10' is nested inside the V-shaped configuration 10 and shares the same intermediate axis c. FIG. 8 shows that each group includes two nested V-shaped configurations 10, 10', but those skilled in the art can understand that in practical applications, each group can include more V-shaped configurations 10', that is, include more pairs of elongated slots and magnets located therein, such as but not limited to 3 pairs, 4 pairs, 5 pairs, etc.

According to some further embodiments of the present disclosure, the lobe areas 27a on the elongated slots 15, 15' located outside of the nested V-shaped configurations 10, 10' extend a greater distance than the lobe areas 27b on the elongated slots 15'', 15''' located inside of the nested V-shaped configurations 10, 10'. As shown in FIG. 8, the extension distance mentioned here refers to the distance from the lobe area to the outside of the side extension line b of the mounting portion 17. In the context of the present disclosure, "the elongated slots located outside of the nested V-shaped configurations" and "the elongated slots located inside of the nested V-shaped configurations" are in terms of the position of the V-shaped configurations relative to each other. When the two elongated slots are compared, the elongated slot that is relatively closer to the intermediate axis c is the "the elongated slot located inside of the nested V-shaped configurations", and the other is "the elongated slots located outside of the nested V-shaped configurations". When each group includes more pairs of elongated slots, the extension distance of the lobe area is arranged in order of the distance from the intermediate axis c, and the lobe area of the elongated slot that is farther from the intermediate axis c extends a farther distance outside the edge extension line b.

Figure 9:
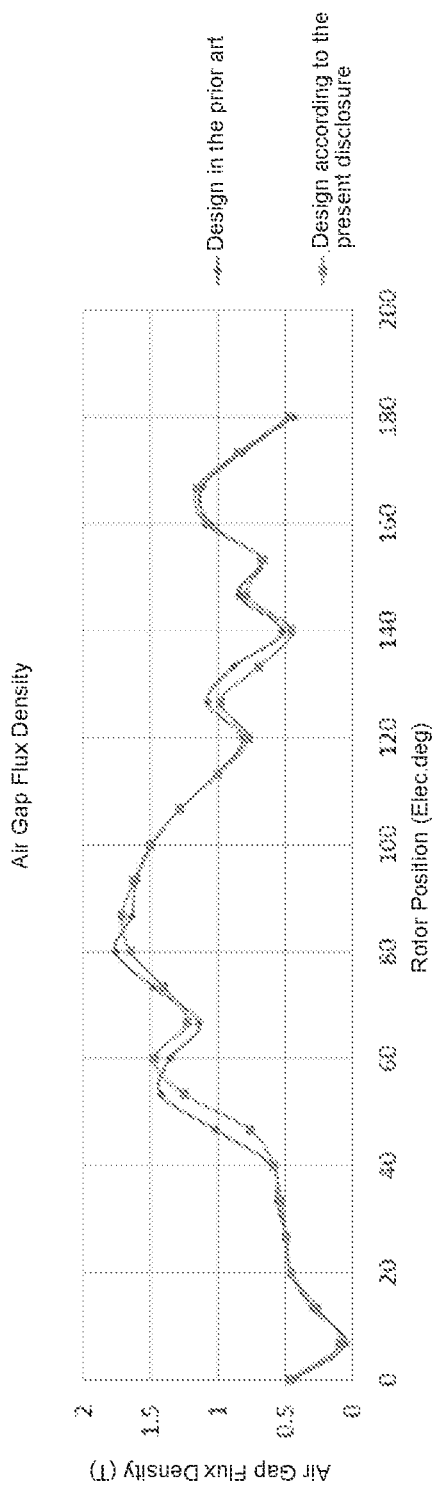
FIG. 9 shows a comparison of air gap flux density of the electric machine designed according to the present disclosure and of the electric machine in the prior art.

FIG. 9 shows a comparison of the air gap flux density of the electric machine designed according to the present disclosure and of the electric machine in the prior art. It can be seen from the figure that at different rotor positions (0-180 deg), the design according to the present disclosure has a reduced flux density compared with the design in the prior art.

Calculation of the core loss P may be calculated according to:

$$P = P_h + P_c + P_e = K_h f B_m^2 + K_c f^2 B_m^2 + K_e f^{1.5} B_m^{1.5}.$$

wherein, $P_h$ is hysteresis loss, $P_e$ is eddy loss, $P_c$ is excess loss, $K_h$ is hysteresis loss coefficient, $K_c$ is eddy loss coefficient, $K_e$ is excess loss coefficient, $B_m$ Is flux density and f is frequency. It can be seen from the equation above that the square of the flux density $B_m$ is proportional to the core loss P. In other words, even a small reduction in the flux density $B_m$ can achieve a large reduction in the core loss P. According to calculations, when the current is 488 A, gamma (electrical angle)=52deg, and speed=1000 rpm, with the design of the present disclosure, the core loss is reduced from 102.2692 (100%) to 99.9092 (97.7%), and the loss is significantly improved.

According to another aspect of the present disclosure, referring again to FIG. 7, an electric machine rotor 46 including the rotor core 62 is also provided. The rotor core 62 includes a plurality of permanent magnets 13 and several of pairs of elongated slots 15 and 15' circumferentially distributed on the rotor core 62. Each pair of elongated slots 15 and 15' jointly form a V-shaped configuration 10 with an opening facing an outer periphery 21 of the rotor core 62. Each of the elongated slots 15, 15' includes a mounting portion 17 that matches the shape of the permanent magnet 13, and an end hole 19. The end holes 19 are located at an ends of the elongated slots 15, 15' pointing to an outer periphery 21, and includes a main body area 35 and a lobe area 27. The lobe area 27 extends from an end of the main body area 35 adjacent to the outer periphery 21 to an exterior of the V-shaped configuration 10 until it is partially located outside the side extension line b of the mounting portion. In the context of the present disclosure, "an end of the main body area 35 adjacent to the outer periphery 21" refers to the end of the main body area 35 farthest from the mounting portion 17. It should be understood that all the embodiments, features and advantages described above for the electric machine rotor according to the first aspect of the present disclosure are equally applicable to the electric machine rotor according to the other aspect of the present disclosure, provided that they do not conflict with each other. That is to say, all the above-mentioned embodiments and their variants can be directly transferred and combined with this. For the sake of brevity of the present disclosure, the description will not be repeated here.

According to another aspect of the present disclosure, referring to FIG. 1, there is also provided a vehicle electric machine 14 including the electric machine rotor 46 in any of the aforementioned embodiments. Likewise, all the embodiments, features and advantages described above for the electric machine rotor 46 according to the present disclosure are equally applicable to the vehicle electric machine 14 according to the present disclosure, and will not be repeated here.

In summary, compared with the prior art, the present disclosure proposes an electric machine rotor and a vehicle electric machine containing the same. The electric machine rotor and the electric machine according to the present disclosure can significantly reduce the overall core loss of the electric machine by changing the local topology of the rotor.

Where it is technically possible, the technical features listed in relation to different embodiments can be combined with each other to form further embodiment within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "including" is inclusive and has the same scope as "comprising".

The above-mentioned embodiments are possible examples of implementations of the present disclosure and are given only for the purpose of enabling those skilled in the art to clearly understand the principles of the invention. It should be understood by those skilled in the art that the above discussion to any embodiment is only illustrative, and is not intended to imply that the disclosed scope of the embodiments of the present disclosure (including claims) is limited to these examples; under the overall concept of the invention, the technical features in the above embodiments or different embodiments can be combined with each other to produce many other their variants in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. An electric machine rotor including a rotor core, the rotor core comprising:
   a plurality of magnets and pairs of elongated slots circumferentially distributed on the rotor core, each pair of elongated slots jointly forming a V-shaped configuration with an opening facing an outer periphery of the rotor core, wherein each elongated slot comprises:
   a mounting portion corresponding to shape of one of the plurality of magnets; and
   an end hole located at an end of the elongated slot pointing to an outer periphery of the rotor core, wherein, the end hole includes a lobe area and a main body area having a middle area including a portion that extends partially outside a first side extension line of the mounting portion, and the lobe area extends from the main body area toward an exterior of the V-shaped configuration until the lobe area is partially located outside a second side extension line of the mounting portion opposite the first side extension line, wherein the main body area further comprises a tapered area that tapers from the middle area toward the mounting portion to form a transition portion between the middle area and the tapered area.

2. The electric machine rotor of claim 1, wherein the tapered area has a width at an end connected to the mounting portion smaller than a width of the mounting portion.

3. The electric machine rotor of claim 1, wherein the transition portion is located on an outer side of the V-shaped configuration.

4. The electric machine rotor of claim 1, further comprising a second transition portion formed between the main body area and the lobe area.

5. The electric machine rotor of claim 1, wherein the end holes of each pair of elongated slots are symmetrical with respect to an intermediate axis of the V-shaped configuration.

6. The electric machine rotor of claim 1, wherein the lobe area extends a distance greater than 1 mm outside the side extension line of the mounting portion.

7. The electric machine rotor of claim 1, wherein the pairs of elongated slots are symmetrically distributed with respect to a central axis of the rotor core.

8. The electric machine rotor of claim 1, wherein the pairs of elongated slots include a plurality of groups, and the V-shaped configurations formed by the pairs of elongated slots in each group face the same radial direction of the rotor core and are nested one inside the other with the elongated slots located on the inside of the nested V-shaped configurations parallel to respective elongated slots on the outside of the nested V-shaped configurations.

9. The electric machine rotor of claim 8, wherein the lobe areas on the elongated slots located on the outside nested V-shaped configurations extend a greater distance than the lobe areas on the elongated slots located on the inside of the nested V-shaped configurations.

10. An electric machine rotor including a rotor core, the rotor core comprising:
    a plurality of permanent magnets;
    pairs of elongated slots circumferentially distributed on the rotor core, each pair of elongated slots jointly forming a V-shaped configuration with an opening facing an outer periphery of the rotor core, each elongated slot comprising:
    a mounting portion configured to receive one of the plurality of permanent magnets; and
    an end hole located at an end of the elongated slot pointing to the outer periphery, wherein the end hole includes a lobe area and a main body area having a middle area including a portion that extends partially outside a first side extension line of the mounting portion, the lobe area extending from an end of the main body area adjacent to the outer periphery to an exterior of the V-shaped configuration such that the lobe area extends partially outside a second side extension line of the mounting portion.

11. The electric machine rotor of claim 10, wherein the main body area further comprises a middle area and a tapered area that tapers from the middle area toward the mounting portion to form a transition portion between the middle area and the tapered area.

12. The electric machine rotor of claim 11, wherein the tapered area has a width at an end connected to the mounting portion smaller than a width of the mounting portion.

13. The electric machine rotor of claim 11, wherein the transition portion is located on an outer side of the V-shaped configuration.

14. The electric machine rotor of claim 10, wherein end holes of each pair of elongated slots are symmetrical with respect to an intermediate axis of the V-shaped configuration.

15. The electric machine rotor of claim 10, wherein the lobe area extends a distance greater than 1 mm outside the side extension line of the mounting portion.

16. The electric machine rotor of claim 10, wherein the pairs of the elongated slots include a plurality of groups, and the V-shaped configurations formed by the pairs of elongated slots in each group face the same radial direction of the rotor core and are nested one inside the other.

17. The electric machine rotor of claim 16, wherein lobe areas on the elongated slots located outside of the nested V-shaped configurations extend a greater distance than lobe areas on the elongated slots located inside of the nested V-shaped configurations.

18. An electric machine rotor including a rotor core, the rotor core comprising:

a plurality of permanent magnets;

pairs of elongated slots circumferentially distributed on the rotor core, each pair of elongated slots having a first pair of elongated slots jointly forming a V-shaped configuration with an opening facing an outer periphery of the rotor core, and a second pair of elongated slots forming a V-shaped configuration nested within the first pair with elongated slots of the second pair parallel to respective elongated slots of the first pair, each elongated slot comprising:

a mounting portion configured to receive one of the plurality of permanent magnets; and an end hole located at an end of the elongated slot pointing to the outer periphery, wherein the end hole includes a lobe area and a main body area having a middle area including a portion that extends partially outside a first side extension line of the mounting portion, the lobe area extending from an end of the main body area adjacent to the outer periphery to an exterior of the V-shaped configuration such that the lobe area extends partially outside a second side extension line of the mounting portion.

* * * * *